(12) United States Patent
Nørgaard (10) Patent No.: US 8,319,723 B2
(45) Date of Patent: Nov. 27, 2012

(54) ADAPTIVE DISPLAYING SCHEME

(75) Inventor: Lars Nørgaard, Herning (DK)

(73) Assignee: Bang & Olufsen A/S, Struer (DK)

( * ) Notice: Subject to any disclaimer, the term of this patent is extended or adjusted under 35 U.S.C. 154(b) by 336 days.

(21) Appl. No.: 12/671,583

(22) PCT Filed: Jul. 30, 2008

(86) PCT No.: PCT/IB2008/053052
§ 371 (c)(1),
(2), (4) Date: Apr. 23, 2010

(87) PCT Pub. No.: WO2009/016591
PCT Pub. Date: Feb. 5, 2009

(65) Prior Publication Data
US 2010/0194288 A1      Aug. 5, 2010

Related U.S. Application Data

(60) Provisional application No. 60/953,311, filed on Aug. 1, 2007.

(51) Int. Cl.
*G09G 3/00* (2006.01)
(52) U.S. Cl. ..................... 345/102; 345/169
(58) Field of Classification Search .......... 345/102, 345/168, 169, 156, 204, 207; 315/149, 156, 315/159, 157, 158
See application file for complete search history.

(56) References Cited

U.S. PATENT DOCUMENTS

| | | |
|---|---|---|
| 7,236,154 B1 | 6/2007 | Kerr et al. |
| 2002/0180973 A1 | 12/2002 | MacKinnon et al. |
| 2004/0012556 A1 * | 1/2004 | Yong et al. ............... 345/102 |

FOREIGN PATENT DOCUMENTS

EP          1 379 082          1/2004

OTHER PUBLICATIONS

International Search Report for PCT/IB2008/053052.
Written Opinion of the International Search Authority for PCT/IB2008/053052 Feb. 1, 2010.

* cited by examiner

*Primary Examiner* — David H Vu
(74) *Attorney, Agent, or Firm* — Stites & Harbison PLLC; Marvin Petry (57) ABSTRACT

A method and a system for improving the psychovisual experience of watching a display are presented. Measurements on the ambient light are performed by a sensor element, from which characteristics of the ambient light are derived. These are subsequently applied in a light-source adjustment model to determine the output of the light-source element. Moreover, a method and a system for adjusting the output of a light-source element by a feed-back loop involving the output from the light-source element and the input to a sensor element are revealed. In addition, the sensor element is also employed for adjusting the output of an electronic display by applying the results of the measurements to a preference model.

17 Claims, 4 Drawing Sheets

ADAPTIVE DISPLAYING SCHEME

CROSS REFERENCE TO RELATED APPLICATIONS

This application claims benefit of U.S. Provisional Application No. 60/953,311, filed Aug. 1, 2007 (which is hereby incorporated by reference).

TECHNICAL FIELD

The present invention relates generally to human visual perception of pictures presented on a display, and specifically to systems and methods for optimizing the human visual perception of pictures presented on the picture screen of an electronic display, such as a television set or corresponding electronic equipment.

BACKGROUND OF THE INVENTION

The psychovisual experience of watching an electronic display depends on the ambient light in the surroundings. As an example, at low ambient-light levels it may be experienced as strenuous and tiring for the eye to watch an electronic display, especially if the surroundings behind an electronic display are not sufficiently illuminated. On the other end of the scale, at high ambient-light levels the color of the displayed picture may be experienced as being in dissonance with the surroundings if it differs too much from the color of the ambient light.

SUMMARY OF THE INVENTION

Generally, the object of the present invention is to improve the psychovisual experience of watching a display. As an example, one object of the present invention is to provide a method for illuminating the surroundings of an electronic display, where the method takes the light characteristics, such as the correlated color temperature and the intensity, of the ambient light into account. As the reflective properties of the surroundings may vary, another object of the present invention is to provide a method for adjusting the illuminating light to the reflective properties of the surroundings. Further, another object of the present invention is to provide a method for adjusting the display parameters of a picture signal to the ambient light in the surroundings.

According to a first aspect of the present invention, the above objects are obtained by the present invention by the provision of a method for illuminating the surroundings of a display—for instance an electronic display such as the picture screen of a television set—by a light-source element, comprising the steps of:

performing a measurement on the ambient light with a sensor element, deriving light characteristics of the ambient light from the measurement, deriving an output, for the light-source element by applying the derived light characteristics to a light-source adjustment model, and applying the light-source element to produce the output.

The output of the light-source element may be described by a particular correlated color temperature and the intensity or any other appropriate characteristics of light.

In addition, according to a second aspect of the present invention, a method is provided for adjusting an output of a light-source element by a feed-back loop including a sensor element, the method comprising the steps of:

leading the output from the light-source element to the sensor element by using a calibration-light guide, performing a measurement of the light from the calibration-light guide using the sensor element, deriving current light characteristics of the light from the measurement, providing reference-light characteristics, which may, for instance, be stored in an electronic memory device, deriving an output for the light-source element by applying the current light characteristics and the reference-light characteristics to a light-source adjustment model, and applying the light-source element to produce the output.

Further, according to a third aspect of the present invention, a method is provided for adjusting the output of an electronic display, comprising the steps of:

performing a measurement of the ambient light with a sensor element, deriving light characteristics of the ambient light from the measurement, deriving a display adjustment by applying the light characteristics to a preference model, applying the display adjustment to a video signal of the electronic display.

In a preferred embodiment, the same light-source element and/or the same sensor element may be used in several of the methods above. This may have the advantage of a simpler and cheaper technical realization when two or more of the methods are to be employed.

The light-source element may be temporarily mounted on the electronic display, i.e. the light-source element is a separable unit that may have been attached to the electronic display after finalizing the construction of the latter. Alternatively, the light-source element may be permanently mounted on the electronic display as an integrated installation. The light-source element may also be a separate unit that is not mounted on the electronic display, i.e. light-source element may be placed at a distance from the electronic display.

In a preferred embodiment, the surroundings may be more illuminated by the light-source element at low levels of the ambient light than at high levels of the ambient light, which means that the output for the light-source element may be derived by a light-source adjustment model that provides an approximately inverse relationship between the intensity of the ambient light and the intensity of the light from the light-source element. The inverse relationship may correspond to both monotonically and non-monotonically decreasing functions over the intensity ranges of interest for the light-source adjustment model.

The light-source element may have the ability to substantially reproduce the light characteristics, such as the correlated color temperature and the intensity, of natural light sources and common artificial light sources. Natural light sources may be the sun and artificial light sources may be incandescent devices or gas-discharge devices, e.g. halogen lamps or fluorescent tubes. The sun as a light source shall be understood as also including atmospheric effects influencing the light characteristics.

The saturation, brightness, contrast and/or other display parameters may be used as additional input parameters to a light-source adjustment model. For example, the light-source adjustment model may respond to an increase in the brightness by increasing the output of the light-source element, i.e. increasing the intensity of the emitted light. As another example, if the correlated color temperature of the ambient light increases, the light-source adjustment model may respond by increasing the white-point correlated color temperature of the electronic display.

In a preferred embodiment, only the surroundings behind the electronic display may be directly illuminated by the light-source element. The surroundings in question may be a wall upon which the electronic display is mounted. Here, by defining a plane from three surface points of the picture screen of the electronic display, the surroundings behind the display may be interpreted as the surroundings that are located on the opposite side of the plane from which the picture screen is intended to be viewed. In this particular example, when the electronic display is viewed from the intended direction, no direct light from the light-source element will reach the viewer.

In a preferred embodiment, the measurement with the sensor element is on ambient light that has been reflected on the surroundings behind the display. Here, the surroundings behind the display may be interpreted as in the preceding paragraph. Regarding the method for illuminating the surroundings, this particularly preferred embodiment may be employed when the reflective characteristics of the surroundings are known to some degree and are included in the light-source adjustment model. Further, this embodiment may also be used in the light-source adjustment model to derive the part of the output for the light-source element that corresponds to intensity. However, in order to avoid a disturbing feed-back loop and to derive an appropriate output intensity, it may be necessary to momentarily prevent direct and/or indirect light from the light-source element to reach the surroundings behind the display. This may easily be achieved by temporarily turning off the output from the light-source element during measurement. In essence, the measurement of the light that has been reflected on the surroundings may be considered a reference measurement that can be employed in light-source adjustment model when determining the output of the light-source element. As an example of a particular embodiment, the reference measurement may subsequently be used as a chromaticity reference to minimize the chromaticity difference between the ambient light and the output of the light-source element.

The light-source element may comprise an individual light source, i.e. it may have only a single light-emitting device. In a preferred embodiment, the individual light source may be a light-emitting diode, organic light-emitting diode, incandescent device and/or gas-discharge device. Examples of the latter two may be halogen lamps and fluorescent tubes.

In a preferred embodiment, the light-source element comprises a plurality of individual light sources having emission characteristics that may differ between the individual light sources. The differences in the emission characteristics may be achieved by different electrical driving conditions, e.g. different voltages over the individual light sources, or by using different kinds of individual light sources, or a combination of both. As an example, a light-source element may comprise a halogen lamp and a light-emitting diode, where the electrical driving conditions may differ between the two individual light sources. As another example, a light-source element may comprise a plurality of identical halogen lamps, where the individual halogen lamps may be operated under a plurality of different electrical driving conditions. As yet another example, a light-source element may comprise a plurality of light-emitting diodes, where the light from the light-emitting diodes may be optimized for a plurality of different colors, and an individual light-emitting diode may be operated under a plurality of different electrical driving conditions. As an extension to the last example, the light-source element may also comprise a plurality of different halogen lamps, and the individual halogen lamps may be operated under a plurality of different electrical driving conditions. The driving conditions may be set by the output for the light-source element obtained from a light-source adjustment model.

The light-source element may also comprise an optical color filter. This filter may influence the light characteristics of the output from an individual light source. As an example to this preferred embodiment, a blue optical filter may be used in combination with a halogen lamp to produce bluer output. In a preferred embodiment, the light-source element may comprise a plurality of halogen lamps, which may be employed together with a plurality of optical filters having a plurality of colors. In addition, light-emitting diodes, in particular non-monochromatic light-emitting diodes, such as those relying on fluorescence to produce a wider color-spectrum of the emitted light, or those producing light by a multitude of different band-gaps, may also be used together with optical color filters.

In a preferred embodiment, the light-source element comprises a light guide of a transparent and/or reflective body. An example of a light guide may be a solid body, where light may enter the body through one part of its surface and leave the body through another part of the surface. In a preferred embodiment, the light guide may be an optical fiber, prism, mirror, lens, transparent sheet or a similar arrangement. In a preferred embodiment, the light guide may be of an optically diffuse material and/or may comprise an optical diffuser layer. The purpose of using a diffusing light guide may be to mix the light from several individual light sources, making the individual light sources appear less as point sources. When in operation, the light-source may appear to illuminate the surroundings in a more homogeneous fashion as a result of the mixing of the light, especially if the light source comprises a plurality of different light sources and/or a plurality of different optical color filters.

In a preferred embodiment, the same sensor element is used in several of the earlier mentioned methods, i.e. the method for illuminating the surroundings of an electronic display, the method for adjusting the output of a light-source element by a feed-back loop, and the method for adjusting the white point setting of an electronic display. This may have the advantage of a simpler and cheaper technical realization when two or more of the methods are to be employed. Alternatively, individual sensor elements may be employed for the first and the second method, as they are ordered here, i.e. they do not use the same sensor element. In yet another embodiment, three elements may be individually employed so that none of the three methods uses the same sensor.

In a preferred embodiment, the sensor element may be temporarily mounted on the electronic display, i.e. the sensor element is a separable unit that may have been attached to the electronic display after finalizing the construction of the latter. Alternatively, the sensor element may be permanently mounted on the electronic display as an integrated installation. In a preferred embodiment, the sensor element may also be a separate unit that is not mounted on the electronic display, i.e. sensor element may be placed at a distance from the electronic display.

In a preferred embodiment, the white point of the output of the electronic display is altered by the display adjustment from the preference model. The display adjustment of said white point may be more prominent at high levels of said ambient light than at low levels of said ambient light. Here, high levels and low levels are simply defined as relative terms, where the former corresponds to the higher intensities. Further, the saturation, brightness, contrast and/or other display parameters of the output of the electronic display may also be altered by the display adjustment. As an example to this, the brightness may increase with an increasing intensity of the ambient light and decrease with a decreasing intensity of the ambient light.

In a preferred embodiment, an adaption to changes in the ambient light is set to occur smoothly over a time that is approximately in the closed interval of 1 to 3 minutes, or over a time that approximately corresponds to the adaption rate of the human vision at the lighting conditions set by the surroundings and the ambient light. An adaption rate of the human vision may, under certain lighting conditions, be approximately 2 minutes. The adaption may be incorporated in a light-source adjustment model or a preference model. In an alternative embodiment, the adaption to changes in the ambient light may occur over a time in the open intervals of 0 to 15 minutes, 1 to 5 minutes, and/or 2 to 3 minutes. Further, the adaption to changes may occur over a time in the open intervals of 0 to 1 minute, 1 to 2 minutes, 2 to 3 minutes, 3 to 5 minutes, and/or 5 to 15 minutes. The smooth adaption may be achieved by repeatedly measuring the ambient light with a sensor element, calculating a moving average of the measurements, and applying the moving average to light-source adjustment model or a preference model. The moving average may correspond to an arithmetic, geometric or harmonic mean, or one of the corresponding weighted means. In a specific embodiment, the moving average is a weighted mean, where the weights are normalized to unity. The measurements included in the moving average may be from within a fixed time window, which moves forward as time progresses. Further, the delay between two subsequent measurements may be constant. If a weighted mean is employed, the weight of a measurement may depend on its position within the time window. As an example, a later measurement may have a stronger weight than an earlier measurement. The length of the time window may be in the open interval of 0 to 15 minutes, 1 to 5 minutes, and/or 2 to 3 minutes. Further, the length of the time window may be in the open intervals of 0 to 1 minute, 1 to 2 minutes, 2 to 3 minutes, 3 to 5 minutes, and/or 5 to 15 minutes. As another example, the weights may be modeled after the adaption rate of the human vision. There may also be several of adaptations for the models to choose from, e.g. one smooth as described above, and one instantaneous where the adjustment to changes in the ambient light occurs as fast as the involved system will allow.

The sensor element may comprise an individual sensor. The individual sensor may be dedicated for being used in combination with a specific optical filter, or for measuring a specific range of colors in the output from an optically dispersive medium. In a preferred embodiment, the individual sensor may detect light from a projected area in a specific direction relative to the display.

In a preferred embodiment, the individual sensor may be a photodiode, phototransistor, photoresistor and/or charge-coupled device CCD. The individual sensor may be a color CCD, i.e. a CCD masked with an optical color filter array. Here the filter array may comprise a mosaic of different color filters, e.g. a filter array having characteristics that are substantially similar to that of a Bayer filter. Specific filter standards, such as one corresponding to the RGB color model, may be used. The pixel array of a CCD may be divided into smaller sub-arrays, where each sub-array is treated as an individual sensor.

The sensor element may comprise a plurality of individual sensors, where all sensors are of the same type. As an example, the individual sensor may all be a specific kind of color CCD. In an alternative embodiment, the sensor element may comprise a plurality of individual sensors of a plurality of sensor types. An example to this may be a sensor element comprising a photodiode and a CCD, or two different kinds of CCDs.

In a preferred embodiment, the sensor element may comprise an optically dispersing and/or absorbing medium, e.g. a prism, grating, grism and/or an optical filter. In a preferred embodiment some of the ambient light may be guided to a sensor element by an ambient-light guide. In a preferred embodiment the ambient-light guide may be an optical fiber, prism, mirror or lens, where the mirror or lens may collect or disperse light.

The ambient-light guide may be of an optically diffuse material and/or comprise a diffuser layer. This embodiment may be of a particular advantage if the ambient light reaching the sensor element is anisotropic, or if it does not evenly illuminate the collecting area or surface of the sensor element. In this scenario, the optically diffuse material and/or diffuser layer will have an effect that resembles a spatial averaging of the ambient light.

In a preferred embodiment, the sensor element simultaneously detects light from several projected areas in several directions relative to the display. This may be achieved by having an ambient-light guide that collects light from several directions. An example to this may be a set of optical fibers, where each fiber points in a specific direction. Another example may be a collecting lens combined with a mask comprising a plurality of apertures. In another embodiment, a sensor element may be mounted on a rotating device, which will allow successive measurements of several discrete solid angles if the sensor element itself measures light from a specific projected area. With sufficiently small rotations, resulting in overlapping projected areas, this embodiment may alternatively be used for a spatially continuous measurement of the ambient light.

A spatially continuous measurement may also be achieved by having a wide-angle lens, such as a fisheye lens, which images the surroundings within a large solid angle onto a small area. The wide-angle lens may be used in combination with an individual sensor masked with an optical color filter array, such as a color CCD, to produce a spatially and spectrally resolved measurement. In a preferred embodiment, the surroundings are directly imaged onto the area of a color CCD by the lens. A subset of the CCD array is then given a specific weight, depending on what part of the surroundings that is imaged onto the subset array, and on the corresponding light characteristics.

In a preferred embodiment, the light characteristics are weighted in the adjustment and/or preference models described above depending on the directions the corresponding ambient light comes from. In practice, the weighting may be included in a model by multiplying a light characteristic—derived from a measurement with a sensor element—with a factor, which depends on the direction of the measured ambient light. As an example, the light-source adjustment model may respond more, i.e. with a higher weighting, to ambient light that comes from the front than from the back of the electronic display. For light coming from the front, the light-source adjustment model may respond more to ambient light coming from a wider angle than a narrower angle relative to a line parallel to the surface normal of the electronic display. For light coming from the back, the light-source adjustment model may respond less to ambient light coming from a wider angle than a narrower angle relative to a line parallel to the surface normal of the electronic display. In one particular embodiment, the light-source adjustment model gives the highest weighting to light coming from the front and at an angle of 45 degrees to a line parallel to the surface normal of the electronic display.

Alternatively, in another preferred embodiment, a weighting may be achieved by having a lens of an optically diffuse material. Through the inherent attenuation of light of the diffuse materials, different travelling distances in the lens can produce a spatial weighting of the ambient light. In addition, the lens material may also have the characteristics of an optical filter, or the lens may be used in conjunction with an optical filter coating or a separate optical filter. As the amount of light absorbed by an optical filter depends on the travelling distance in the filter material, a spatial weighting may also be achieved through the use of an optical filter material, instead of an optically diffuse material. The lens may be of a non-spherical and/or asymmetrical shape to produce a preferred weighting of the measured ambient light. By combining several lenses with different shapes having different absorbing characteristics or, alternatively, having different separate optical filters, it may be possible to simultaneously derive a spatial weighting of a light characteristic that corresponds to color of the ambient light.

In another preferred embodiment, several asymmetric lenses of the same shape and of the same optically diffuse material are employed, where they are combined with different optical filter coatings or different separate optical filters. In yet another preferred embodiment, the asymmetric lenses may be of the same shape but of different optically diffuse materials, where they are combined with different optical filter coatings or different separate optical filters. In both of these embodiments, the asymmetric lenses are oriented so that they face the same direction, i.e. a line going through two points on the surface of one lens is substantially parallel to a line going through the corresponding points of the other lens. Alternatively, the lenses may be of the same shape but of different filter materials. In a preferred embodiment, two asymmetric lenses of the same shape and the same optically diffuse material are oriented in the same direction, where one lens is used in conjunction with a blue separate color filter, and the other lens is used in conjunction with a red separate color filter. The correlated color temperature is then estimated from the ratio formed between the intensities of the ambient light collected by the two lenses.

Hence, according to a fourth aspect of the present invention, a method is provided for obtaining a spatial weighting in a measurement of the ambient light, comprising the steps of:
leading the ambient light through an asymmetric lens to a sensor element, and performing the measurement on the ambient light using the sensor element.

The asymmetric lens may be made of an optical material having an adjustment effect on a light characteristic, where the magnitude of the adjustment effect depends on the path length light travels in the optical material. Clearly, this method may be used together with any embodiment involving a measurement of the ambient light.

In a preferred embodiment, the asymmetric lens may be manufactured of an optical material having the characteristics of an absorbing optical filter. In another preferred embodiment, the asymmetric lens may be divided into a plurality of adjoining sections, where each section is of an optical material having the characteristics of an absorbing optical filter, and where the characteristics differ between the sections. For example, the optical material may be a neutral-density filter or an optical color filter in both these preferred embodiments.

An optical diffuser may be placed between the asymmetric lens and the sensor element to achieve an averaging effect of the light passing through the lens. This effect may also be achieved if the optical material is optically diffuse. Note that the optical material of the asymmetric lens may both have the characteristics of an optical diffuser and of an absorbing optical filter.

When a feed-back loop, according to the present invention, is applied for adjusting the output of a light-source element, the method comprises a step where the output from the light-source element is led to the sensor element by a calibration-light guide.

The calibration-light guide according to the second aspect of the present invention may be the surroundings of the display. This embodiment may be of particular relevance if the output of a light-source element is to be adjusted according to the optical properties of the illuminated surroundings. Here, the surroundings are to be understood as including one or more physical objects or materials having a line-of-sight to the detector element. A physical object may be a fixed installation, e.g. a wall, or a loose installation, e.g. a movable screen. The line-of-sight may be through a transparent material, e.g. a window. In another preferred embodiment, the calibration-light guide is an optical fiber, a mirror, a prism, or any other optical device for changing the direction of light. The calibration-light guide may be the same as the light guide of the light-source element, which may simplify an adjustment of the output of a light-source element based on the direct light from the light-source elements. Evidently, in this preferred embodiment, the light guide of the light-source element is the same optical component as the calibration-light guide.

In a preferred embodiment, the reference-light characteristics correspond to a previous measurement with a sensor element on an output from a light-source element. This embodiment may be essential for adjusting the output from a light-source element as a response to time-induced changes. The output characteristics of a light source may change over time, especially if it is operated close to its maximum power. Further, the absorbance of some filters may also change, which may happen if they are subjected to heating, e.g. by being close to a halogen lamp. The light-source adjustment model may compensate for the time-induced changes by simply comparing the current light characteristics with the reference-light characteristics, and then derive an output for the light-source element from the difference, where the light characteristics of the output are substantially the same as the reference-light characteristics. Evidently, in a preferred embodiment, the light-source adjustment model may be employed for partly or fully compensating time-induced changes in the output characteristics of the light-source element.

In a preferred embodiment, the reference-light characteristics correspond to the output from a light-source element. This embodiment may be essential for determining or compensating for the reflective characteristics of the surroundings illuminated by a light-source element. As an example, a light-source element may illuminate the wall upon which the electronic display is mounted, where the wall and the surface of the picture screen may be substantially coplanar. Upon reflection, the wall may change the output characteristics of the light from the light-source element. From the point of view of a human watching the electronic display, this may have the effect that the reflected light no longer has the preferred characteristics. In order to obtain the preferred characteristics of the reflected light, which may be close to that of the ambient light, the output may be changed according to the method for adjusting the output of a light-source element. If the reference-light characteristics correspond to the output of the light-source element, and the current light characteristics correspond to the reflected light from the light-source element, the reflective characteristics of the wall may then be readily derived and employed in the light-source adjustment model to compensate for the reflection. Evidently, the light-source adjustment model may be employed for partly or fully compensating the reflective characteristics of the surroundings.

Concerning both the method for illuminating the surroundings of an electronic display, and the method for adjusting an output of a light-source element by a feed-back loop, in a preferred embodiment the methods may be optimized to provide an output of the light-source elements that, after reflection onto the surroundings, to a human observer appear to have color characteristics close to that of the ambient light.

In a preferred embodiment, the reference-light characteristics may belong to a plurality of different reference-light characteristics. In one particular embodiment, there may be two reference-light characteristics, corresponding to measurements with a sensor element at two separate occasions. This particular embodiment may be employed for adjusting the output of a light-source element after two particular settings relative to the surroundings, e.g. at two separate orientations of the light-source element, or at two separate locations of the light-source element. This particular embodiment may also be employed for adjusting to two configurations of the surroundings, e.g. for the presence or absence of a particular object, such as a screen, close to the light-source element. Another particular embodiment may be two reference-light characteristics corresponding to the measurement of the output from a light-source element with two different sensor elements. This particular embodiment may be employed for adjusting time-induced changes in the spectral distribution of the output from a light-source element. The two sensor elements may differ in that they have different optical color filters fitted, e.g. a blue and a red filter, and the ratio between the two reference-light characteristics then gives a first measure of a spectral distribution, while the ratio between the corresponding current light characteristics gives a second measure of the same kind. A difference between these two ratios may indicate that the spectral distribution has changed over time, which may be adjusted for by changing the output of a light-source element so that the value of the second ratio is substantially the same as the value of the first ratio. This adjustment may be performed in an iterative process included in a light-source adjustment model. Yet another particular embodiment may be two reference-light characteristics corresponding to the measurement of the output from two different light-source elements using a single sensor element. This particular embodiment may be employed for adjusting time-induced changes in the relative intensity of the two light-source elements. If on both occasions the light characteristics are obtained under the same driving conditions, the ratio between the two reference-light characteristics, i.e. a first measure of a relative intensity, and the ratio between the corresponding current light characteristics, i.e. a second measure of a relative intensity, may differ as a result of time-induced changes. The changes in the relative intensities may be adjusted for by changing the output of one of the light-source elements so that the value of the second ratio is substantially the same as the value of the first ratio. As in the other particular embodiment, this adjustment may be performed in an iterative process included in a light-source adjustment model. It is understood that the particular embodiments given here are not limited to only two reference-light characteristics. The number of reference-light characteristics may be increased to include more technical components, e.g. more light-source elements or sensor elements, or to include more occasions or points in time.

In a preferred embodiment, the light-source adjustment model may belong to a plurality of different light-source adjustment models. As an example, one model may be optimized for adjusting time-induced changes in the output of a light-source element, while the other may be optimized to compensate for the reflective characteristics of the surroundings as disclosed earlier.

In a preferred embodiment, the light characteristics may correspond to the number of photons measured by the sensor element and the energy of the corresponding photons. It may be assumed that the light is monochromatic, i.e. all photons have substantially the same energy, or it may be assumed that the photons have a distribution in energy, where the distribution may correspond to monochromatic light at several distinct energies, or the distribution may be continuous, or the distribution may be a combination of the first two exemplified distributions.

In a preferred embodiment, the light characteristics may correspond to the correlated color temperature and the intensity of the ambient light. Alternatively, in another embodiment the light characteristics may correspond to the spectral distribution of the ambient light, e.g. to a multitude of parameter pairs, where each pair represents an intensity value and a frequency or wavelength value. It is also contemplated that in another preferred embodiment, only one of the light characteristics may be employed, e.g. only the correlated color temperature may be derived or employed in the methods above, while the intensity is left out of the method.

It may be assumed that the picture screen of the electronic display emits light. To be more specific, in a preferred embodiment the picture screen may be on an electronic display, such as a backlit liquid crystal display LCD, a field emission display FED, a plasma display, a cathode ray tube CRT, or any other kind of flat-panel display. It is also contemplated that all of the adjustments mentioned above can be done by hand instead of by using models, e.g. by manually setting the white point and/or the output of a light-source element. This may be preferred when a viewer may want to illuminate the surroundings in a fashion that cannot be achieved by applying a light-source adjustment model. Further, several such manual settings may be stored and later employed at the discretion of the viewer.

Below a comprehensive summary of the different aspects and embodiments of the present invention is given.

According to a first aspect of the present invention there is thus provided a method for illuminating the surroundings of a display, such as an electronic display, by a light-source element, comprising the steps of:

performing a measurement on the ambient light with a sensor element, deriving light characteristics of said ambient light from said measurement, deriving an output for said light-source element by applying said derived light characteristics to a light-source adjustment model, and applying said light-source element to produce said output.

According to a second aspect of the present invention there is thus provided a method for adjusting an output of a light-source element by a feed-back loop including a sensor element, said method comprising the steps of:

leading said output from said light-source element to said sensor element by using a calibration-light guide, performing a measurement of the light from said calibration-light guide using said sensor element, deriving current light characteristics of said light from said measurement, recalling reference-light characteristics,
deriving an output for said light-source element by applying said current light characteristics and said reference-light characteristics to a light-source adjustment model, and
applying said light-source element to produce said output.

Said method according to the first aspect of the present invention may comprise the adjustment of the output of the light-source element according to the method outlined under the second aspect of the present invention.

The sensor element employed for illuminating the surroundings of a display and the sensor element employed for adjusting the output of a light-source element by a feed-back loop may be two different devices according to the first and/or the second aspects of the present invention. The sensor element employed for illuminating the surroundings of a display and the sensor element employed for adjusting the output of a light-source element by a feed-back loop may be the same device according to the first and/or the second aspects of the present invention.

Said light-source element may be temporarily mounted on said electronic display; said light-source element may be permanently mounted on said electronic display; and/or said light-source element may not be mounted on said electronic display according to the first and/or the second aspects of the present invention.

According to the first and/or the second aspects of the present invention said surroundings may be more illuminated by said light-source element at low levels of said ambient light than at high levels of said ambient light; and/or said light-source element may have the ability to substantially reproduce the light characteristics of natural light sources and common artificial light sources.

The saturation, brightness, contrast and/or other display parameters may be used as additional input parameters to said light-source adjustment model; the surroundings behind said display may be directly illuminated by said light-source element; and/or said measurement may be on ambient light that has been reflected on the surroundings behind said display according to the first and/or the second aspects of the present invention.

According to the first and/or the second aspects of the present invention, said light-source element may comprise an individual light source according to the first and/or the second aspects of the present invention; said individual light source may be a light-emitting diode, organic light-emitting diode, incandescent device and/or gas-discharge device; said light-source element may comprise a plurality of said individual light sources having light emission characteristics that differ between said individual light sources; said light-source element may also comprise an optical color filter; said light-source element may comprise a light guide of a transparent and/or reflective body, said light guide may be an optical fiber, prism, mirror, lens, transparent sheet or a similar arrangement; and/or said light guide may be of an optically diffuse material and/or may comprise an optical diffuser layer.

According to a third aspect of the present invention there is thus provided a method for adjusting the output of an electronic display, comprising the steps of:
performing a measurement on the ambient light with a sensor element, deriving light characteristics of said ambient light from said measurement,
deriving a display adjustment by applying said light characteristics to a preference model,
applying said display adjustment to a video signal of said electronic display.

Said methods according to the first and/or second aspects of the present invention may comprise the method outlined under the third aspect of the present invention.

According to the first, second and third aspects of the present invention, the sensor element employed for illuminating the surroundings of a display and the sensor element employed for adjusting the white point of an electronic display may be two different devices; the sensor element employed for illuminating the surroundings of a display and the sensor element employed for adjusting the white point of an electronic display may be the same device; said sensor element may be temporarily mounted on said electronic display; said sensor element may be permanently mounted on said electronic display; said sensor element may not be mounted on said electronic display; the white point of said output of said electronic display may be altered by said display adjustment.

Said display adjustment of said white point may be more prominent at high levels of said ambient light than at low levels of said ambient light; the saturation, brightness, contrast and/or other parameters of said output of said electronic display may be altered by said display adjustment; and/or an adaption to changes in said ambient light may be set to occur over a time in the open intervals of 0 to 15 minutes, 1 to 5 minutes, and/or 2 to 3 minutes, and/or over a time in the open intervals of 0 to 1 minute, 1 to 2 minutes, 2 to 3 minutes, 3 to 5 minutes, and/or 5 to 15 minutes according to the first, second and/or third aspects of the present invention.

According to the first, second and/or third aspects of the present invention, said sensor element may comprise an optical filter, prism, grating and/or grism; said ambient light may be guided to said sensor element by an ambient-light guide; said ambient-light guide may be an optical fiber, prism, mirror or lens; said ambient-light guide may be of an optically diffuse material and/or comprises a diffuser layer; said sensor element may detect light from several projected areas in several directions relative to the display simultaneously; said sensor element may comprise an individual sensor; said individual sensor may detect light from a projected area in a specific direction relative to said display; said individual sensor may be a photodiode, phototransistor, photoresistor and/or charge-coupled device; said individual sensor may be a color charge-coupled device or a charge-coupled device masked with a mosaic of an optical color filter array; said sensor element may comprise a plurality of individual sensors, where all sensors are of the same type; said sensor element may comprise a plurality of individual sensors of a plurality of sensor types; said sensor element may comprise a plurality of said individual sensors having light-detection characteristics that differ between said individual sensors.

Said light characteristics may be weighted in said models depending on the directions said ambient light comes from; said calibration-light guide may be the surroundings of the display; said calibration-light guide may be an optical fiber, a mirror, or any other optical device for changing the direction of light; said reference-light characteristics may correspond to a previous measurement with said sensor element on the output from said light-source element; said light-source adjustment model may be employed for partly or fully compensating time-induced changes in the output characteristics of said light-source element; said reference-light characteristics may correspond to the output from said light-source element; said light-source adjustment model may be employed for partly or fully compensating for the reflective characteristics of said surroundings; said light guide of said light-source element may be the same optical component as said calibration-light guide; said reference-light characteristics may belong to a plurality of different reference-light characteristics; said light-source adjustment model may belong to a plurality of different light-source adjustment models; said light characteristics correspond to the number of photons measured by said sensor element and to the energy of said photons; said light characteristics may correspond to the correlated color temperature and the intensity of said ambient light;

only one of said light characteristics is employed; the picture screen of said electronic display emits light; and/or said electronic display may be an LCD, FED or plasma flat-panel display according to the first, second and/or third aspects of the present invention.

According to a fourth aspect of the present invention there is thus provided a method for obtaining a spatial weighting in a measurement of ambient light, comprising the steps of:
   leading said ambient light to a sensor element by an asymmetric lens, and
   performing said measurement on said ambient light using said sensor element,
where said asymmetric lens is of an optical material having an adjustment effect on a light characteristic, and the magnitude of said adjustment effect depends on the path length that light travels in said optical material.

Said methods according to the first, second and/or third aspects of the present invention may comprise the method outlined under the fourth aspect of the present invention.

According to the first, second, third and/or fourth aspects of the present invention, said optical material may have the characteristics of an absorbing optical filter; said asymmetric lens may be divided into a plurality of adjoining sections, where each section is of an optical material having the characteristics of an absorbing filter, and said characteristics differ between said sections; said optical material may be an optical neutral-density filter; said optical material may be an optical color filter; an optical diffuser may be placed between said asymmetric lens and said sensor element; and/or said optical material may be optically diffuse.

According to a fifth aspect of the present invention there is thus provided a system for illuminating the surroundings of a display by a light-source element, the system comprising:
   a sensor element for performing a measurement on the ambient light,
   a light-source element for illuminating said surroundings,
   a sensor sub-system for deriving light characteristics from said measurement,
   an adjustment-model sub-system for applying said light characteristics to a light-source adjustment model to derive a light-source system signal,
   a light-source element sub-system for applying said light-source system signal to derive a light-source control signal for said light-source element,
   communication means between the sub-components.

According to a sixth aspect of the present invention there is thus provided a system for adjusting the output of a light-source element, which is suitable for illuminating the surroundings, by a feed-back loop including a sensor element, the system comprising:
   a sensor element for performing a measurement on the ambient light,
   a light-source element for illuminating said surroundings,
   a calibration light-guide for leading light from said light-source element to said sensor element,
   a memory sub-system for storing information corresponding to an output or expected output characteristics of said light-source element, a sensor sub-system for deriving light characteristics from said measurement,
   an adjustment-model sub-system for applying said light characteristics and said information in said memory sub-system to a light-source adjustment model to derive a light-source system signal,
   a light-source element sub-system for applying said light-source system signal to derive a light-source control signal for said light-source element,
   communication means between the sub-components.

According to a seventh aspect of the present invention there is thus provided a system for adjusting an original video signal for an electronic display, the system comprising:
   a sensor element for performing a measurement on the ambient light,
   a sensor subsystem for deriving light characteristics from said measurement,
   a video-signal source providing said original video signal,
   an adjustment-model sub-system for applying said light characteristics to a preference model to derive a displaying-adjustment signal,
   a picture-screen sub-system for communicating video information and/or said original video signal and for adjusting said original video signal according to said displaying-adjustment signal,
   a picture screen for displaying an adjusted original video signal, communication means between the sub-components.

According to an eighth aspect of the present invention there is thus provided a system for illuminating the surroundings of an electronic display by a light-source element, the system comprising:
   a light-source element for illuminating said surroundings,
   a video-signal source providing said original video signal,
   a picture-screen sub-system for communicating video information and/or said original video signal and for adjusting said original video signal according to said displaying-adjustment signal,
   an adjustment-model sub-system for applying said video information to a light-source adjustment model to derive a light-source system signal, communication means between the sub-components.

BRIEF DESCRIPTION OF THE DRAWINGS

The above mentioned objects and preferred embodiments are now to be disclosed in relation to a non-limitative presently preferred embodiment with reference to the figures, in which.

A presently preferred embodiment of the method for illuminating the surroundings of a display—for instance, but not necessarily limited to, a television picture screen—is described with reference to the schematically illustrated system in FIG. 1. A sensor element 10 performs a measurement on the ambient light and a corresponding measurement signal is subsequently transferred to a sensor sub-system 11 through a communication means 21. The sensor element 10 performs a spatially resolved measurement, and the measurement signal may also contain the corresponding spatial information. In another embodiment, the spatial information is built into the system, i.e. by having a sensor element that only detects light from a fixed solid angle, to which the rest of the system is adapted.

The sensor sub-system 11 derives a light characteristics signal from the measurement signal. In the presently preferred embodiment, the light characteristics correspond to the correlated color temperature and the intensity of the ambient light. Further, the light characteristics signal may also include spatial information that corresponds to the spatial information in the measurement signal.

The light characteristics signal is transferred to the adjustment-model sub-system 12 through a communication means 22. The adjustment-model sub-system 12 applies the light characteristics signal corresponding to the correlated color temperature and the intensity of the ambient light to a light-source adjustment model, which gives a light-source system signal. This signal is communicated to the light-source element sub-system 13, which converts the light-source system signal to a light-source control signal. The light-source control signal is transferred to a light-source element 14 through the communication means 24, and the light-source element 14 converts the control signal to light. Note that in another embodiment there may be a plurality of light-source elements connected to the light-source element sub-system 13, where the light-source control signals may differ depending on what light-source element they are intended for. Further, in another embodiment there may be a plurality of sensor elements connected to the sensor sub-system 11.

Figure 1:
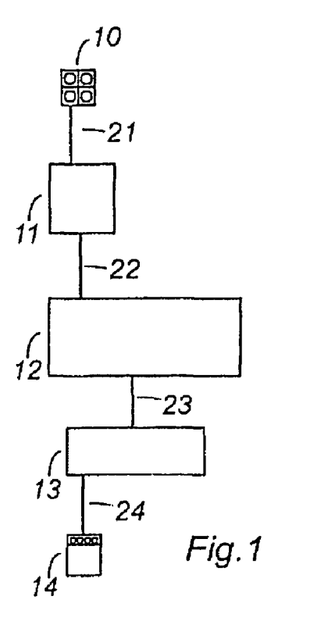
FIG. 1 schematically illustrates a system for adjusting an output of a light-source element to ambient light in the surroundings, FIG. 2 schematically illustrates a system for adjusting an output of a light-source element by a feed-back loop, FIG. 3 schematically illustrates a system for adjusting a display parameter, FIG. 4 schematically illustrates a light-source element, FIG. 5 schematically illustrates a sensor element, FIG. 6 schematically illustrates a preference model for a white-point adjustment, FIG. 7 schematically illustrates a preference model for a saturation adjustment, FIG. 8 schematically illustrates a light-source adjustment model, FIG. 9 schematically illustrates an asymmetric lens.

In the presently preferred embodiment, the light-source adjustment model is such that the system in FIG. 1 produces an output from a light-source element 14 that appears, for a human observer, to have substantially the same correlated color temperature as the ambient light, while the intensity of the output follows a substantially inverse relationship to the intensity of the ambient light. This may imply that the correlated color temperature and the intensity are substantially the same for the ambient light and the output from the light-source element 14.

A presently preferred embodiment of the method for adjusting an output of a light-source element by a feed-back loop is described with reference to the schematically illustrated system in FIG. 2. The output from a light-source element 14' is led to sensor element 10' by way of a calibration light-guide 20'. The presently preferred embodiment may include two applications of the system in FIG. 2: the first concerns an adjustment as a response to the reflective characteristics of the surroundings, while the second concerns an adjustment as a response to changes in the output of the light-source element.

For the first suggested application concerning the surroundings, the calibration light-guide 20' has to include a reflection upon the surroundings, for which the output from the light-source element 14' shall be adjusted. In the presently preferred embodiment, the picture screen may be that of a flat-panel display, e.g. an electronic display with a width and height that is considerably larger than the depth, where the light-source element 14' illuminates a wall upon which the electronic display is mounted, and where the sensor element 10' detects some of the light reflected on the wall.

The sensor element 10' performs a spatially resolved measurement, i.e. detects some of the light reflected on the wall, and the measurement signal also contains the corresponding spatial information. Alternatively, in another embodiment, the spatial information is built into the system, i.e. the rest of the system is adapted to a sensor element that measures light from a fixed solid angle, i.e. from a fixed area in a specific direction.

The sensor sub-system 11' derives a light characteristics signal from the measurement signal. In the presently preferred embodiment, the light characteristics correspond to the correlated color temperature and the intensity of the ambient light. Further, the light characteristics signal also includes spatial information that corresponds to the spatial information in the measurement signal.

The light characteristics signal is transferred to the adjustment-model sub-system 12' through the communication means 22'. Information that corresponds to the output characteristics of the light-source element 14' is stored in the non-volatile memory sub-system 15', from where it is transferred to the adjustment-model sub-system 12' through the communication means 25' as an output characteristics signal. The two signals are used as inputs in an adjustment model, which derives information that corresponds to the reflective characteristics of the surroundings. This information is contained in a reflective characteristics signal, which is sent through the communication means 25' to the memory sub-system 15', where the information is stored.

In the presently preferred embodiment, if there is information in the memory sub-system 15' that corresponds to the reflective characteristics of the surroundings, a reversed reflective characteristics signal may be transferred through the communication means 25' instead of an output characteristics signal. The combined light characteristics signal and the reversed reflective characteristics signal are then employed as input in a light-source adjustment model, which gives a light-source system signal. This signal is communicated to the light-source element sub-system 13', which converts the light-source system signal to a light-source control signal. The light-source control signal is transferred to a light-source element 14' through the communication means 24', and the light-source element 14' converts the control signal to light.

Note that in another embodiment there may be a plurality of light-source elements connected to the light-source element sub-system 13', where the light-source control signals may differ depending on what light-source element they are intended for. Further, in another embodiment there may be a plurality of sensor elements connected to the sensor sub-system 11', where the output of an individual light-source element may depend on the measurement signal from an individual sensor element.

For the second suggested application, concerning the adjustment as a response to changes in the output of the light-source element, light from the light-source element 14' is led to a sensor element 10' by a light-guide. The sensor element 10' performs a spatially resolved measurement and the measurement signal also contains the corresponding spatial information. Alternatively, in another embodiment, the spatial information is built into the system, i.e. the rest of the system is adapted to a sensor element that measures light from a fixed solid angle, i.e. from a fixed area in a specific direction.

The sensor sub-system 11' derives a light characteristics signal from the measurement signal. In the presently preferred embodiment, the light characteristics correspond to the correlated color temperature and the intensity of the ambient light. Further, the light characteristics signal also includes spatial information that corresponds to the spatial information in the measurement signal.

Note that if the calibration light-guide 20' has a noticeable influence on the light from the light-source element 14', this can be compensated for if the optical characteristics of the calibration light-guide 20' are known and stored in the memory sub-system 15' and if they are employed in the light-source adjustment model.

The light characteristics signal is transferred to the adjustment-model sub-system 12' through the communication means 22'. Information that corresponds to the expected output characteristics of the light-source element 14' is stored in the non-volatile memory sub-system 15', from where it is transferred to the adjustment-model sub-system 12' through the communication means 25' as an expected output-characteristics signal. The two signals are used as inputs in an adjustment model, which derives information that corresponds to time-induced changes in the output characteristics of the light-source element 14'. This information is contained in a time-change characteristics signal, which is sent through the communication means 25' to the memory sub-system 15', where the information is stored.

In the presently preferred embodiment, if there is information in the memory sub-system 15' that corresponds to time-induced changes in the output characteristics of the light-source element 14', a reversed time-change characteristics signal may be transferred through the communication means 25' instead of an expected output-characteristics signal. The combined light characteristics signal and the reversed time-change characteristics signal are then employed as input in a light-source adjustment model, which gives a light-source system signal. This signal is communicated to the light-source element sub-system 13', which converts the light-source system signal to a light-source control signal. The light-source control signal is transferred to a light-source element 14' through the communication means 24', and the light-source element 14' converts the control signal to light.

Note that in another embodiment there may be a plurality of light-source elements connected to the light-source element sub-system 13', where the light-source control signals may differ depending on what light-source element they are intended for. Further, in another embodiment there may be a plurality of sensor elements connected to the sensor sub-system 11', where the output of an individual light-source element may depend on the measurement signal from an individual sensor element.

Figure 2:
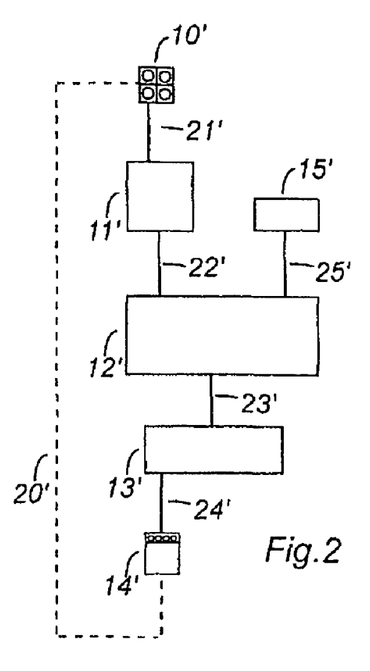

In the presently preferred embodiment, the light-source adjustment model is such that the system in FIG. 2 produces an output from a light-source element 14' that appears, for a human observer, to have substantially the same characteristics as the ambient light. This means that the correlated color temperature and the intensity are substantially the same for the ambient light and the output from the light-source element 14'.

A presently preferred embodiment of the method for adjusting the white point of an electronic display is described with reference to the schematically illustrated system in FIG. 3. A sensor element 10" performs a measurement on the ambient light and a corresponding measurement signal is subsequently transferred to a sensor sub-system 11" through a communication means 21". The sensor element 10" performs a spatially resolved measurement, and the measurement signal may also contain the corresponding spatial information. In another embodiment, the spatial information is built into the system, i.e. by having a sensor element that only detects light from a fixed solid angle, to which the rest of the system is adapted.

The sensor sub-system 11" derives a light characteristics signal from the measurement signal. In the presently preferred embodiment, the light characteristics correspond to the correlated color temperature and the intensity of the ambient light. Further the light characteristics signal may also include spatial information that corresponds to the spatial information in the measurement signal.

The light characteristics signal is transferred to the adjustment-model sub-system 12" through a communication means 22". The adjustment-model sub-system 12" applies the light characteristics signal to a preference model, which gives a display adjustment signal. This signal is communicated through the communication means 26" to the picture-screen sub-system 16", to which also the video-signal source 17" transmits an original video signal through the communications means 27". The picture-screen sub-system 16" adjusts the original video signal according to the display adjustment signal, yielding a modified video signal. The modified video signal is transferred through the communication means 28" to the picture screen 18", where the signal is converted to a visible picture.

In the presently preferred embodiment, the picture-screen sub-system 16" also communicates information about the original video signal to the adjustment-model sub-system 12" through the communication means 26" as a displaying characteristics signal. This signal and the light-characteristics signal from 22" are used as input in a light-source adjustment model, which gives a light-source system signal. This signal is communicated to the light-source element sub-system 13", which converts the light-source system signal to a light-source control signal. The light-source control signal is transferred to a light-source element 14" through the communication means 24", and the light-source element 14" converts the control signal to light. Note that in another embodiment there may be a plurality of light-source elements connected to the light-source element sub-system 13", where the light-source control signals may differ depending on what light-source element they are intended for. Further, in another embodiment there may be a plurality of sensor elements connected to the sensor sub-system 11".

Figure 3:
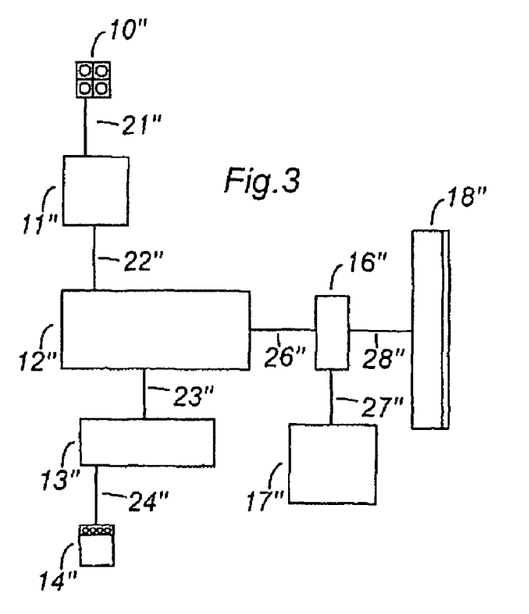

In the presently preferred embodiment, the light-source adjustment model is such that the system in FIG. 3 produces an output from a light-source element 14" that appears, for a human observer, to have approximately the same characteristics as the ambient light. This means that the correlated color temperature is substantially the same for the ambient light and the output from the light-source element 14'

Further, in another presently preferred embodiment, the three systems schematically illustrated in FIG. 1 to FIG. 3 are all part of the same electronic display system, i.e. the primes and double-primes can be removed without introducing any ambiguity in the description of the methods.

Figure 4:
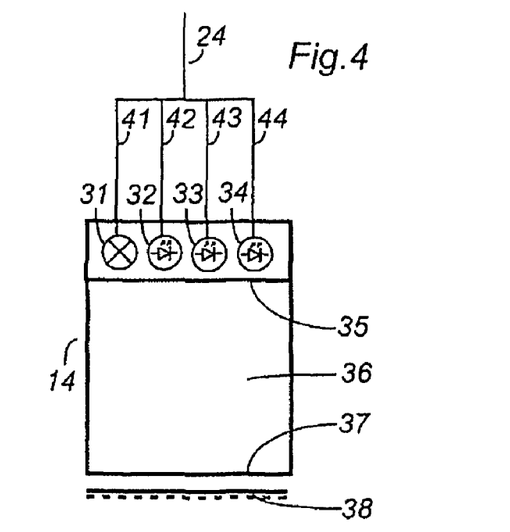

A presently preferred embodiment of a light-source element 14 is described with reference to the schematically illustrated device in FIG. 4. A light-source control signal is transferred to the light-source element 14 through the communication means 24. The light-source element 14 comprises four individual light sources 31-34, where each individual light source is connected to communication means 24 by individual communication means 41-44. In the presently preferred embodiment, the individual light-source element 31 is a halogen lamp, 32 is red light-emitting diode, 33 is a yellow light-emitting diode, and 34 is a blue light-emitting diode.

An individual light-source control signal is transferred through each of the individual communication means 41-44 to the individual light sources 31-34. The four signals can differ between one another and are variable, which makes it possible to vary the summed output of the light-source element 14. The light from the individual light sources is led through a first surface 35 of a light guide 36. The light guide 36 is manufactured of an optically diffuse material, which will blend the light from the four individual light sources 31-34, making light guide appear as an essentially homogeneous illumination source when the light exits the light guide through a second surface 37. In another embodiment, the light-source element also comprises a diffuser layer or optical filter 39 located after the second surface 37.

Generally, a light-source element may comprise any number of individual light sources covering a range of different output characteristics, where the individual light sources may be controlled individually to produce a variety of outputs. The individual light sources may be chosen anywhere between two extremes. One extreme is to choose the individual light sources with respect to their chromaticity, which can be calculated by using e.g. the CIE system, utilizing CIE standard observer color matching functions. This ensures the chromatic correctness of the output from the light-source element. However, it does not ensure a chromaticity match with the ambient light when the output light is reflected upon the surroundings.

The other extreme is to choose the individual light sources with respect to their spectral distribution, and therefore implicitly also the chromaticity. By having a sufficient number of such individual light sources, specific output characteristics, such as spectral distributions, can be achieved. In this way, when the output from the light-source element is reflected upon the surroundings, a closer chromaticity match with the ambient light may be obtained. For example, an individual light source having a spectral distribution equal to a typical incandescent lamp, with an approximate correlated color temperature in the range of 2850 to 3200K, may be used at one end of the chromaticity range of the system. At the other end of the chromaticity range, an individual light source with an approximate spectral distribution close to average daylight, i.e. with an approximate correlated color temperature in the range of 6500 to 7500K, may be used. By mixing these, and possibly also additional sources in-between, a closer chromaticity match after reflections onto surrounding objects may be achieved. This is useful in the commonly occurring situations where the ambient light is either from an incandescent lamp or natural daylight. In principle having an infinite number of sources, any spectral distribution can be obtained.

In a presently preferred embodiment, a system is optimized to approximate a range of spectral distributions occurring in nature, e.g. those of sunset or sunrise with a correlated color temperature in the range of 1000 to 3000K, or those of blue sky with correlated color temperature in the range of 25000 to 35000K. In a preferred embodiment, the system is capable of producing an output of a light-source element that has a correlated color temperature in the closed ranges of 1000 to 35000K, 1200 to 30000K, 1400 to 25000K, 1600 to 2000K, 1800 to 15000K, and/or 2000 to 10000K; and/or in one of the closed ranges of 1000 to 1200K, 1200 to 1400K, 1400 to 1600K, 1600 to 1800K, 1800 to 2000K, 2000 to 10000K, 10000 to 15000K, 15000 to 20000K, 20000 to 25000K, 25000 to 30000K, and/or 30000 to 35000K.

Figure 5:
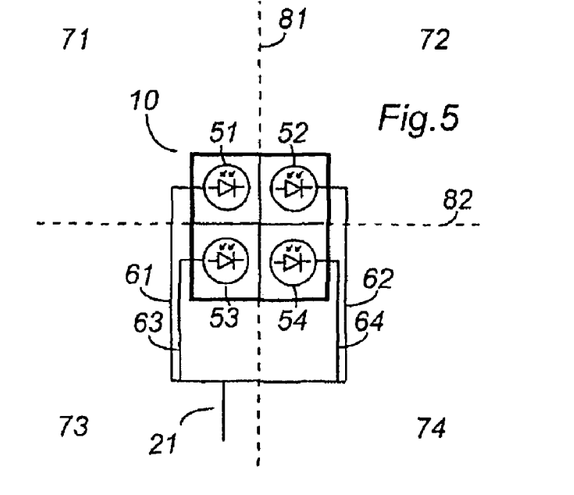

A presently preferred embodiment of a sensor element 10 is described with reference to the schematically illustrated device in FIG. 5. The sensor element comprises four individual sensors 51-54, which are all photodiodes of the same kind. When the sensor element 10 performs a measurement on the ambient light, an individual measurement signal is sent from each of the individual sensors through the corresponding individual communication means 61-64, which are combined into the communication means 21 as described in relation to FIG. 1 to FIG. 3.

There are two perpendicular dashed lines, 81 and 82, representing a division of the three-dimensional space around the electronic display into four separate regions 71-74. The regions 71 and 72 are behind the electronic display, i.e. on the opposite side from which the picture screen is viewed, while the regions 73 and 74 are in front of the display. This means that, with an essentially planar picture screen, the line 82 represents a plane that is substantially coplanar with the surface of the picture screen. When the electronic display is viewed from the front, the regions 71 and 73 are to the left of the electronic display and the regions 72 and 74 are to the right.

In the presently preferred embodiment, the sensor element 10 is mounted on an electronic display and the individual sensors 51 and 52 detect light from the surroundings behind the electronic display, i.e. from both of the regions 71 and 72, while the individual sensors 53 and 54 detect light from the surroundings in front of the electronic display, i.e. from both of the regions 73 and 74. The individual sensors 51 and 53 are fitted with an optical blue filter of the same kind, while the individual sensors 52 and 54 are fitted with an optical red filter of the same kind. Thereby, color characteristics of the measured light can be derived by comparing the individual measurement signals from the individual sensors 51 and 52, or from the individual sensors 53 and 54. Further spatial information can be derived by comparing the individual measurement signals from the individual sensors 51 and 53, or from the individual sensors 52 and 54

A presently preferred embodiment of a preference model for a white-point adjustment is described with reference to FIG. 6. In the following text, the concept of correlated color temperature is referred to as CCT.

The white-point CCT of an electronic display may be adjusted by using a preference model that depends on the ambient-light CCT and the ambient-light intensity. The preference model can be represented by a continuous surface in three orthogonal dimensions, where the white-point CCT is on the z-axis 101, the ambient-light CCT on the y-axis 102 and the ambient-light intensity on the x-axis 103. Note that the ambient-light intensity is on a logarithmic scale, base 10, in FIG. 6, while the other axes are linear. The values of the ambient-light CCT and the ambient-light intensity are within closed intervals on the y- and x-axis, respectively, where a value for the white-point CCT is defined for each combination of values within the two intervals. Hence, the projection of the surface onto the xy-plane is a rectangle.

At the lowest ambient-light intensities 111, the white-point CCT is substantially constant for all values of the ambient-light CCT. Note that the ambient-light CCT is not defined for zero ambient-light intensity. At the highest values of the ambient-light CCT 112, the white-point CCT will increase in a monotonic fashion with increasing ambient-light intensity. The increase is slower at higher ambient-light intensities, but the behavior is close to being linear. The highest white-point CCT setting 113, i.e. the global maximum, is found for the highest values of the ambient-light CCT and the ambient-light intensity.

At the highest ambient-light intensities 114, the white-point CCT will decrease in an approximately quadratic fashion with a decreasing ambient-light CCT, where the decrease is the fastest for the lowest values of the ambient-light CCT. The lowest white-point CCT setting 115, i.e. the global minimum, is found for the lowest value of the ambient-light CCT and the highest value of the ambient-light intensity.

At the lowest values of the ambient-light CCT 116, the white-point CCT changes with the ambient-light intensity in an approximately cubic fashion. When going from the highest to the lowest ambient-light intensity, the white-point CCT will first increase to reach the fastest increase approximately at the middle 117 of the ambient-light intensity interval, from where the increase will slow down to reach a local maximum 118. When going from the local maximum 118, the white-point CCT will decrease with decreasing ambient-light intensity. Further, a line from the point of said local maxima 118 to the point of the global maximum 113 will not deviate much from the surface of the white-point setting.

Figure 6:
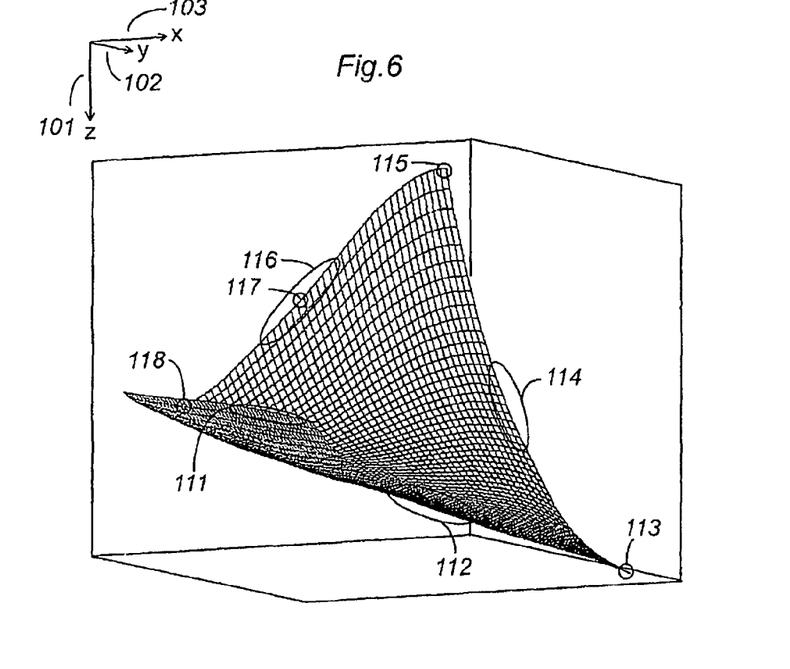

In a preferred embodiment, the preference model for adjusting the white-point CCT of an electronic display has some or all of the features pointed out in relation to FIG. 6, possibly also in addition to other features not shown in the figure. In a particular embodiment, the preference model has the two general features, the first being that the global minimum 115 is found at the lowest value of the ambient-light CCT and at the highest value of the ambient-light intensity, the second being that the global maximum 113 is found for the highest values of the ambient-light CCT and the ambient-light intensity.

As an example of different lighting conditions, high ambient-light intensities and low ambient-light CCT can be reached at sunset, sunrise, or by using an incandescent lamp, while high ambient-light intensities and high ambient-light CCT can be reached in daylight. Apart from at the lowest ambient-light intensities, the white-point CCT will generally follow the ambient-light CCT at constant ambient-light intensities.

Figure 7:
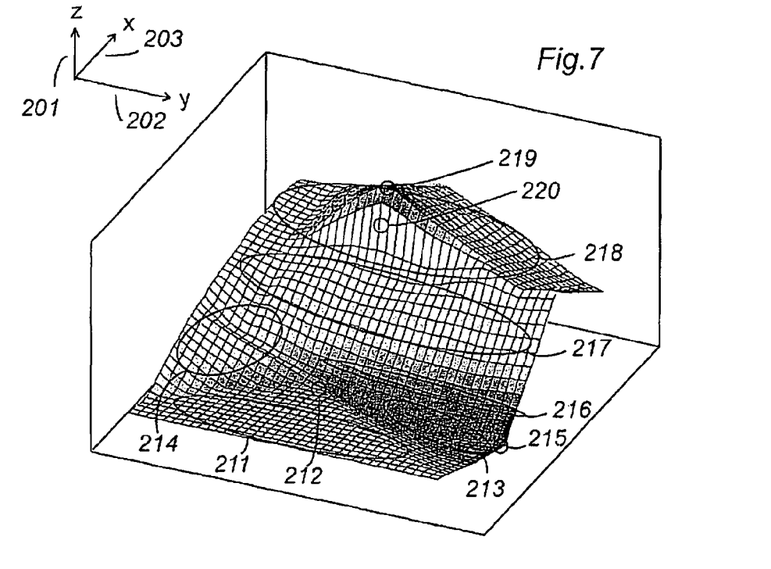

A presently preferred embodiment of a preference model for a saturation adjustment is described with reference to FIG. 7. In the following text, the concept of correlated color temperature is referred to as CCT.

The saturation, i.e. the ratio chroma over lightness, of the displayed image may be adjusted according to a preference model that depends on the ambient-light CCT and the ambient-light intensity. As an example of how this may be done in practice, the lightness component is kept at unity, while the chroma component of the video signal is multiplied by an adjustment factor that is derived from a preference model. Generally, it is desirable that the preference model generates an adjustment factor so that the saturation increases when the ambient-light intensity is increased. The adjustment factor may be in the range of 1.0 to 1.3.

A preference model for adjusting the saturation may also include more complicated features. As for the white-point CCT setting of the display, the saturation adjustment preference model can be represented by a continuous surface in three orthogonal dimensions, where the adjustment factor is on the z-axis 201, the ambient-light CCT on the y-axis 202 and the ambient-light intensity on the x-axis 203. Note that the ambient-light intensity is on a logarithmic scale, base 10, in FIG. 7, while the other axes are linear. The values of the ambient-light CCT and the ambient-light intensity are within closed intervals on the y-axis 202 and x-axis 203, respectively, where a value for the adjustment factor is defined for each combination of values within the two intervals. Hence, the projection of the surface onto the xy-plane is a rectangle.

An example of a surface with typical features for the adjustment of the saturation is given here. At low ambient-light intensities, the surface may have a plateau 211, where the adjustment factor is fairly constant over a large range of ambient-light CCT values. For this region, the adjustment factors may be close to a value of 1.0. The plateau may be the most prominent 212 at an ambient-light CCT of 4000K, where it reaches the highest ambient-light intensity. At this point, the surface may transform into a valley 213, with a bottom that stretches in the direction of higher ambient-light CCT values, while it transforms into a relatively shallow slope 214 of increasing adjustment factors in the direction of lower ambient-light CCT values. At the maximum of the ambient-light CCT interval, the bottom of the valley may reach its lowest point 215, which may represent a global minimum of the closed surface. The side of the valley that corresponds to higher values of the ambient-light intensity may continue in a rise 216 that merges with the aforementioned shallow slope 214, to present a general rise 217 of the adjustment factor over the entire range of ambient-light CCT values. At higher ambient-light intensities, the general rise 217 may terminate in a ridge 218, behind which the adjustment factor may decrease. The ridge 218 may have a peak 219, which may represent a global maximum of the closed surface, where the peak is located at an ambient-light CCT between 3000K and 6000K. When going towards higher values of the ambient-light intensity, the surface may have its highest gradient 220 on the general rise close to the peak. The peak of the saturation adjustment surface may be located at an ambient-light intensity that is roughly five times larger than the approximate bottom of the valley.

Figure 8:
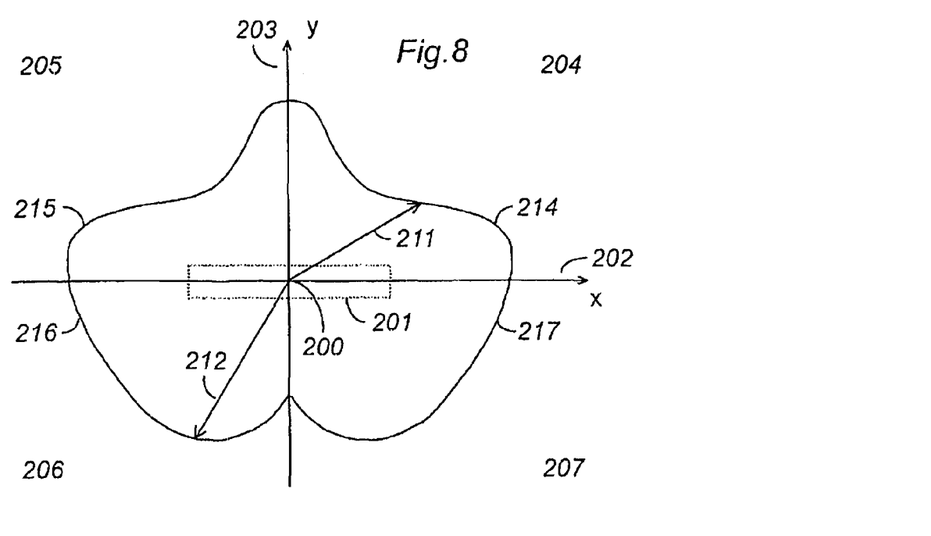

A presently preferred embodiment of a light-source adjustment model is described with reference to FIG. 8, where an orthogonal coordinate system is defined relative to a display 201, which is assumed to have a roughly planar picture screen. The x-axis 202 is orthogonal to the y-axis 203, where the latter is the normal to and centered on the picture screen. Further, the x and y-axis are in a horizontal plane that goes through the center 200 of the picture screen, i.e. the center 200 corresponds to the origin of the coordinate system. In practice, ambient light is detected from the three-dimensional space around the display 201. However, the vertical component of the detected light is not considered in this embodiment. Therefore, only a curve in two dimensions—and not a surface in three dimensions—is employed in this particular light-source adjustment model.

The front of the display, i.e. the side intended for being viewed, is visible from the regions 204 and 205, while it is not visible from the regions 206 and 207. The two-dimensional curve of the adjustment model is divided into four segments 214-217 corresponding to the four regions 204-207. In this particular light-source adjustment model, the curve 214-217 may be interpreted as corresponding to the outline of a cross section, or a contour line, of three-dimensional lens. In the presently preferred embodiment, the ambient light is measured over all angles in the horizontal xy-plane. This can be represented by a bound vector, e.g. 211 and 212, indicating the direction of measurement, where the vector starts at the origin 200 and can have any angle in the closed interval of 0 to 360 degrees relative to the x-axis 202. The length of the vector is determined by placing its endpoint on the curve 214-217.

A weighting factor for measured ambient light coming from a specific direction is derived from the length of the vector pointing in the same direction. The weighting factor, in this particular embodiment, is to correspond to the amount of transmitted light. Hence, for the adjustment model in FIG. 8, the weighting factor of the direction given by the vector 212 is smaller than the weighting factor of the direction given by the vector 211. The weighting factor is employed in a weighted mean of several measurements that together cover all angles in the xy-plane, where a light characteristic of the ambient light in a specific direction is multiplied with the corresponding weighting factor. The output of a light-source element, or an individual light source, is then derived from the weighted mean.

In practice, a measurement of the ambient light using a sensor element or an individual sensor is within a certain angular interval, and the center of this interval is used for defining the bound vector. As an example of a particular embodiment where the angles are relative to the x-axis 202, a measurement may collect ambient light between 25 and 35 degrees, while the corresponding bound vector is at 30 degrees. Further, only a finite number of measurements can be performed, which means that a complete measurement of the ambient light in all directions has to be divided into several different angular intervals that, together, cover the closed interval 0 to 360 degrees. As an example, a complete measurement can be achieved by performing 36 individual measurements that together cover 360 degrees, but individually only covers 10 degrees. The subsequent spatial weighting can be considered discrete in the sense that individual measurements in several directions are performed.

Figure 9:
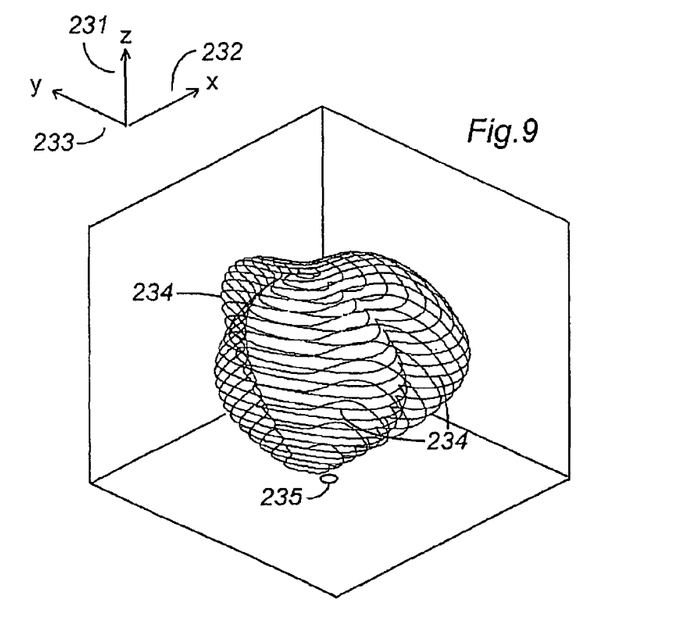

In a presently preferred embodiment, a continuous spatial weighting can be achieved by using an asymmetric lens of an optically diffuse material. Here, the weighting can be considered continuous in the sense that a single measurement will cover all angles in a horizontal plane, i.e. all angles in the closed interval of 0 to 360 degrees. An example of an asymmetric lens, in the form of a three-dimensional contour plot, is shown in FIG. 9, where the asymmetric lens is placed in a three-dimensional orthogonal coordinate system. In relation to a display, the z-axis 231 is vertical, while the x-axis 232 and y-axis 233 define a horizontal plane. The contours of the asymmetric lens all have the same shape, but the circumference of a contour varies along the vertical z-axis 231 to define a closed surface. The ambient light is allowed to reach the asymmetric lens above a certain contour, e.g. the contour 234. A sensor element 235 is placed below the lens, onto which ambient light is directed. The material of the asymmetric lens is optically diffuse, which means that a certain amount of the light from a specific direction will not reach the sensor element 235 due to the scattering of the diffuse material. For an optically diffuse and homogeneous material, the probability for scattering is proportional to the path length. Therefore, the shape of the lens determines how much light from a certain direction will reach the sensor element 235. As the lens is asymmetric, this will result in a spatial weighting of the ambient light. In addition, the optically diffuse material will also produce an averaging effect due to the scattering. Generally, the weighting may be considered as corresponding to the transmittance, e.g. it may be inversely proportional, or linearly decreasing with the path length traveled in the optically diffuse material. If the coordinate axes in FIG. 8 and FIG. 9 are set to coincide, the asymmetric lens may produce a weighting similar to that of the light-source adjustment model, especially if the asymmetric lens is such that the weighting is insensitive to the vertical component of the ambient light.

In another presently preferred embodiment, the asymmetric lens is of an absorbing filter material, instead of an optically diffuse material. The filter material is assumed to have the same characteristics as a neutral-density filter, i.e. the absorption is wavelength independent in the optical region. However, a similar spatial weighting as for the optically diffuse material is achieved, since the absorption is also proportional to the path length that light travels in the filter material. The difference is instead in the averaging effect, which is more prominent for the optically diffuse material. Instead, the averaging effect is achieved by having diffuser layer on the surface of the asymmetric lens below a certain contour, e.g. the contour 234. Alternatively, the same effect is achieved by placing an optical diffuser between the asymmetric lens and the detector element 235, or by having a detector element 234 that comprises an optical diffuser.

In a presently preferred embodiment, two asymmetric lenses are used, where the shape and the absorbing filter material differ between the two lenses. One of the lenses, e.g. of a red optical filter material, has a shape that lends the largest weighting to ambient light reaching the lens from the front of a display. The other lens, e.g. of a blue optical filter material, has a shape that lends the largest weight to ambient light reaching the lens from the back of a display. The lenses are used in conjunction with an optical diffuser to achieve an averaging effect. Alternatively, a similar effect can be achieved with two asymmetric lenses of the same optically diffuse material—having the corresponding shapes—used in conjunction with two different optical filters, where one is red and the other is blue. Each lens images the ambient light onto a sensor element, and a spatial weighting of the light characteristic that corresponds to the photon energy can be derived by combining the measurement signal from the sensor elements. A similar spatial weighting can be achieved by another presently preferred embodiment, where two different light-source adjustment models are used instead of two asymmetric lenses.

In a presently preferred embodiment, an asymmetric lens is manufactured of two different absorbing filter materials. As an example with reference to FIG. 9, the three-dimensional body of the asymmetric lens is divided into two regions by a cutting plane, which is coplanar with the plane defined by the z-axis 231 and the x-axis 232, and goes through the center-of-gravity of the asymmetric lens. With increasing y-coordinates in the direction indicated by the y-axis 233, the front section of the asymmetric lens is on the side of the cutting plane with the larger y-coordinates, while the back section is on the side with the smaller y-coordinates. The front section is of a red optical filter material, while the back section is of a blue optical filter material. Further, the lens is used in conjunction with an optical diffuser as described earlier, to achieve an averaging effect of the light reaching the sensor element 235. Clearly, in this presently preferred embodiment, a single asymmetric lens will achieve a spatial weighting of the light characteristics corresponding to the color of the ambient light.

It is understood that all aspects and all embodiments of the present invention can be combined in other ways than explicitly described here. This will include a merging of all the described models into one general model, i.e. a light-source adjustment model and a preference model may be combined into one general preference model.

All numerical expressions of quantities, properties, or other parameters are understood to be modified in all instances by the term "about", unless otherwise specified. Without limiting any potential application of the doctrine of equivalents, any numerical expressions should at least be construed by applying ordinary rounding techniques to the number of significant digits expressed.

Throughout the specifications, it is understood that the indefinite article "a" or "an" carries either a singular or plural meaning of a claim element. Any later reference, such as the definite articles "the" and "said", to that same claim element also reflects the same potential singularity or plurality. If not specified, the indefinite article may be interpreted as "one or more", and consequently the corresponding claim element has to be read as if in plural form for grammatical correctness.

The invention claimed is:

1. A method for illuminating an area surroundings a display by a light-source element, the display having a front side from which an image can be viewed and a back side that is opposite the front side, the method comprising:
performing a measurement of ambient light with a sensor element,
deriving ambient light characteristics of said ambient light from said measurement,
deriving light output characteristics for said light-source element by applying said derived ambient light characteristics to a light-source adjustment model, and
using said light-source element to produce a light output according to said light output characteristics that is projected away from the display from the back side of the display such that no direct light from the light-source element is projected outward from the front side.

2. A method according to claim 1, further comprising adjusting the light output produced by the light-source element.

3. A method according to claim 2, wherein a second sensor element included within a feed-back loop is employed for adjusting the light output of the light-source element.

4. The methods according to claim 1, where said area surroundings the display is more illuminated by said light-source element at low levels of said ambient light than at high levels of said ambient light.

5. The methods according to claim 1, where said light-source element is configured to substantially reproduce light characteristics of natural light sources and common artificial light sources.

6. The methods according to claim 1, where saturation, brightness, contrast and/or other display parameters are used as additional input parameters to said light-source adjustment model.

7. The methods according to claim 1, where an adaption to changes in said ambient light is set to occur over a time in open intervals of 0 to 15 minutes, 1 to 5 minutes, and/or 2 to 3 minutes, and/or over a time in open intervals of 0 to 1 minute, 1 to 2 minutes, 2 to 3 minutes, 3 to 5 minutes, and/or 5 to 15 minutes.

8. The methods according to claim 1, where said sensor element comprises an optical filter, prism, grating and/or grism.

9. The methods according to claim 1, where said sensor element detects light from several projected areas in several directions relative to the display simultaneously.

10. The methods according to claim 1, where said ambient light characteristics are weighted in said light-source adjustment models depending on directions from which said ambient light is projected.

11. A method according to claim 1, wherein performing the measurement of the ambient light comprises measuring a light intensity of the ambient light, wherein the light-source adjustment model provides for an inverse relationship between the light intensity of the ambient light and a light intensity of the light output produced by the light-source element according to said light output characteristics, and wherein using the light-source element to produce the light output comprises producing the light output having a light intensity that is inversely proportional to the light intensity of the ambient light.

12. A method according to claim 1, wherein performing the measurement of the ambient light comprises measuring a light intensity of the ambient light that is reflected behind the display in the area surrounding the display.

13. A method according to claim 12, wherein measuring the light intensity comprises temporarily turning off the light output produced by the light-source element during measurement.

14. A system for illuminating an area surroundings a display by a light-source element, the display having a front side from which an image can be viewed and a back side that is opposite the front side, the system comprising:
a sensor element for performing a measurement of ambient light,
a light-source element arranged to project light away from the display from the back side of the display such that no direct light from the light-source element is projected outward from the front side,
a sensor sub-system for deriving ambient light characteristics from said measurement,
an adjustment-model sub-system for applying said ambient light characteristics to a light-source adjustment model to derive a light-source system signal,
a light-source element sub-system for applying said light-source system signal to derive a light-source control signal for said light-source element, and
communication means providing for communication between the sensor sub-system, the adjustment-model sub-system, and the light-source element sub-system.

15. A system according to claim 14, wherein the sensor element is configured to derive an intensity of the ambient light, wherein the adjustment-model sub-system is configured to provide an inverse relationship between the intensity of the ambient light and an intensity of light projected from the light-source element, and wherein a light intensity of a light output produced by the light-source element according to the light-source control signal is inversely proportional to the intensity of the ambient light.

16. A system according to claim 14, wherein the sensor element is arranged so as to measure a light intensity of the ambient light that is reflected behind the display in the area surrounding the display.

17. A system according to claim 16, wherein the sensor sub-system and the light-source sub-system are configured to temporarily turn off the light output produced by the light-source element during measurement.

* * * * *